US012715986B2

(12) United States Patent
Sohn et al.

(10) Patent No.: US 12,715,986 B2

(45) Date of Patent: Aug. 25, 2026

(54) RECYCLED POLYPROPYLENE COMPOSITE RESIN COMPOSITION AND WASHING MACHINE COMPRISING THE SAME

(71) Applicant: SAMSUNG ELECTRONICS CO., LTD., Suwon-si (KR)

(72) Inventors: Jooseong Sohn, Suwon-si (KR); Nohcheol Park, Suwon-si (KR); Youngdeog Koh, Suwon-si (KR); Kwangjoo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 641 days.

(21) Appl. No.: 18/345,418

(22) Filed: Jun. 30, 2023

(65) Prior Publication Data

US 2024/0093013 A1 Mar. 21, 2024

Related U.S. Application Data

(63) Continuation of application No. PCT/KR2023/007598, filed on Jun. 2, 2023.

(30) Foreign Application Priority Data

Sep. 14, 2022 (KR) ........................ 10-2022-0115943
Oct. 28, 2022 (KR) ........................ 10-2022-0141809

(51) Int. Cl.
*C08L 23/12* (2006.01)

(52) U.S. Cl.
CPC ......... *C08L 23/12* (2013.01); *C08L 2205/025* (2013.01); *C08L 2205/03* (2013.01)

(58) Field of Classification Search
None
See application file for complete search history.

(56) References Cited

U.S. PATENT DOCUMENTS 5,476,628 A 12/1995 Baumgartl et al.
5,514,745 A 5/1996 Yoshino
6,756,412 B2 6/2004 Muzzy
2023/0295405 A1* 9/2023 Kahlen .................... C08J 11/04

FOREIGN PATENT DOCUMENTS

EP 0 643 093 A1 9/1994
KR 10-0212526 8/1999
KR 10-2005-0005109 1/2005
KR 10-0521426 10/2005
KR 10-0535026 12/2005
KR 10-0537855 12/2005
KR 10-2008-0010045 1/2008
KR 10-2010-0008644 1/2010
KR 10-1134477 4/2012
KR 10-1362069 2/2014
KR 10-2017-0043720 4/2017
KR 10-1760715 7/2017
KR 10-1992598 6/2019
KR 10-2021-0050612 5/2021
KR 10-2021-0119701 10/2021

OTHER PUBLICATIONS

International Search Report issued in International Application No. PCT/KR2023/007598 dated Sep. 25, 2023.
Written Opinion issued in International Application No. PCT/KR2023/007598 dated Sep. 25, 2023.

* cited by examiner

*Primary Examiner* — Michael J Feely
(74) *Attorney, Agent, or Firm* — STAAS & HALSEY LLP

(57) ABSTRACT

Disclosed herein are a recycled polypropylene composite material resin composition and a washing machine including the same. A glass fiber-reinforced recycled polypropylene resin composition includes, in weight percent of the glass fiber-reinforced recycle polypropylene resin composition, about 10 to 30% of waste glass fiber mat-reinforced thermoplastic (GMT), about 35 to 47% of a homo-polypropylene base resin, about 30 to 45% of long glass fiber-reinforced polypropylene, and about 0.5 to 3.0% of a compatibilizer, and a weight average molecular weight of the composition may be about 250,000 g/mol or more.

15 Claims, 2 Drawing Sheets

TUB FRONT

TUB BACK

RECYCLED POLYPROPYLENE COMPOSITE RESIN COMPOSITION AND WASHING MACHINE COMPRISING THE SAME

CROSS-REFERENCE TO RELATED APPLICATION

This application is a continuation of International Application No. PCT/KR2023/007598, filed Jun. 2, 2023, which claims the benefit of Korean Patent Application Nos. 10-2022-0115943 filed on Sep. 14, 2022 and 10-2022-0141809 filed on Oct. 28, 2022 in the Korean Intellectual Property Office, all the disclosures of which are incorporated herein by reference in their entirety.

BACKGROUND

1. Field

Embodiments of the present disclosure relate to a recycled polypropylene composite material resin composition and a washing machine including the same. More specifically, embodiments of the present disclosure relate to a recycled polypropylene resin composition having improved physical properties by optimizing a component range of waste glass fiber mat-reinforced thermoplastic (GMT), a base resin, and long glass fiber-reinforced polypropylene, and a proper mixing ratio and mixing method of short fibers and long fibers, and a washing machine including the same.

2. Description of the Related Art

Environment, social and governance (ESG) is a key topic in the sustainable circular economy, and has become an essential management system for companies. As part of this eco-friendly trend, consumer goods companies are increasing the use of recycled plastics in order to realize a virtuous cycle for waste plastic resources.

Glass fiber-reinforced thermoplastics (GFRTPs) related to the present disclosure are widely used in various fields due to their excellent mechanical properties and light weight parts. However, when recycling GFRTPs, most of the waste is landfilled or incinerated due to the difficulty of separating glass fibers from a base material. In addition, even during mechanical recycling through re-melting, limitations arise due to problems such as fiber breakage, low dispersibility, and polymer degradation.

Conventionally, waste plastics generated from daily life and industry, including household goods, are used as a source to be recycled, and a manufacturing method mainly using recycled polypropylene among olefin-based plastics as a base resin has been utilized. They are mostly un-reinforced polypropylene, and optionally include talc.

However, in the case of conventional recycled plastics, in terms of long-term durability, brittleness of the surface of a polypropylene base material causes crack generation points, and also deterioration of physical properties occurs due to the molecular weight difference between the base materials of recycled polypropylene and new polypropylene, and interfacial separation between polypropylene as a base material and glass fibers as a substrate. Therefore, since there is a limit to their application to structural materials or driving parts, they are mainly applied in a limited manner to non-functional interior parts of non-visible parts.

In addition, molecular weight decreases due to recycling of recycled plastics discarded after long-term use and deterioration at high temperatures progresses during repetitive melt-kneading and extrusion processes, so that overall mechanical properties tend to be inferior to those of new materials. In particular, in the case of a glass fiber-reinforced plastic composite material (GFRP), glass fibers are repeatedly broken during melt-kneading and extrusion during initial processing and recycling, which inevitably results in loss of physical properties. In addition, overall mechanical properties tend to decrease linearly as the content of input recycled material increases. In addition, since ultra-short fiberization occurs due to breakage of glass fibers in conventional recycled materials, it is difficult to recycle glass fibers. Therefore, conventional recycled materials are generally in the form in which new glass fibers and recycled polypropylene are used.

SUMMARY

A glass fiber-reinforced recycled polypropylene resin composition according to one embodiment of the present disclosure includes, in weight percent of the glass fiber-reinforced recycled polypropylene resin composition, about 10 to 30% of waste glass fiber mat-reinforced thermoplastic (GMT), about 35 to 47% of a homo-polypropylene base resin, about 30 to 45% of long glass fiber-reinforced polypropylene, and about 0.5 to 3.0% of a compatibilizer, and a weight average molecular weight of the composition may be about 250,000 g/mol or more.

In the glass fiber-reinforced recycled polypropylene resin composition of the present disclosure, the waste GMT may include about 38 to 42% of long glass fiber and about 58 to 62% of a polypropylene resin, based on 100% by weight of the waste GMT.

In the glass fiber-reinforced recycled polypropylene resin composition of the present disclosure, the waste GMT may have an average remaining fiber length of about 0.5 to 1.0 mm.

In the glass fiber-reinforced recycled polypropylene resin composition of the present disclosure, the homo-polypropylene base resin may have a weight average molecular weight (Mw) of about 300,000 g/mol or more.

In the glass fiber-reinforced recycled polypropylene resin composition of the present disclosure, the long glass fiber-reinforced polypropylene may include about 58 to 62% of a long fiber filament reinforcing material and about 38 to 42% of a polypropylene resin, based on 100% by weight of the long glass fiber-reinforced polypropylene, and the long fiber filament reinforcing material having a diameter of about 0.3 to 30 μm and a length of about 3 to 100 mm.

In the glass fiber-reinforced recycled polypropylene resin composition of the present disclosure, the long glass fiber-reinforced polypropylene may have a tensile strength of about 1,400 kgf/cm$^2$ or more.

In the glass fiber-reinforced recycled polypropylene resin composition of the present disclosure, the long glass fiber-reinforced polypropylene may have a flexural modulus of about 110,000 kgf/cm$^2$ or more.

In the glass fiber-reinforced recycled polypropylene resin composition of the present disclosure, the long glass fiber-reinforced polypropylene may have an impact strength of about 20 kgfcm/cm or more.

In the glass fiber-reinforced recycled polypropylene resin composition of the present disclosure, the compatibilizer may be polypropylene grafted with maleic anhydride.

In the glass fiber-reinforced recycled polypropylene resin composition of the present disclosure, about 0.01 to 0.5% of an additive may be further included by weight of the glass fiber-reinforced recycled polypropylene resin composition.

In the glass fiber-reinforced recycled polypropylene resin composition of the present disclosure, the additive to be added may be one or more of a dispersing agent, an antioxidant, a heat-resistant stabilizer, or a long-term heat-resistant stabilizer.

A method of preparing a glass fiber-reinforced recycled polypropylene resin composition of the present disclosure includes: preparing, in weight percent of the glass fiber-reinforced recycled polypropylene resin composition, about 10 to 30% of waste glass fiber mat-reinforced thermoplastic (GMT), about 35 to 47% of a homo-polypropylene base resin, and about 30 to 45% of long glass fiber-reinforced polypropylene, and about 0.5 to 3.0% of a compatibilizer; and dry mixing the waste GMT and the long glass fiber-reinforced polypropylene.

A method of preparing a glass fiber-reinforced recycled polypropylene resin composition of the present disclosure, wherein the waste GMT is recovered waste GMT, the method may further include, prior to the preparing, crushing the recovered waste GMT to an average remaining fiber length of about 0.5 to 1.0 mm.

In the method of preparing the glass fiber-reinforced recycled polypropylene resin composition of the present disclosure, a weight average molecular weight of the glass fiber-reinforced recycled polypropylene resin composition may be about 250,000 g/mol or more.

An injection-molded article of the present disclosure may be an injection-molded article made of the glass fiber-reinforced recycled polypropylene resin composition of the present disclosure.

The injection-molded article of the present disclosure may have a tensile strength of 1,100 kgf/cm$^2$ or more.

The injection-molded article of the present disclosure may have a flexural modulus of 55,000 kgf/cm$^2$ or more.

The injection-molded article of the present disclosure may have an impact strength of 13 kgfcm/cm or more.

The injection-molded article of the present disclosure may have a fatigue property of 210 kgf/cm$^2$ or more.

A washing machine of the present disclosure includes a cabinet; a tub disposed inside the tub; and a drum rotatably disposed inside the tub, wherein the tub consists of an injection-molded article made of a glass fiber-reinforced recycled polypropylene resin composition using waste GMT, the glass fiber-reinforced recycled polypropylene resin composition includes, in weight percent, 10 to 30% of waste GMT, 35 to 47% of a homo-polypropylene base resin, 30 to 45% of long glass fiber-reinforced polypropylene, and unavoidable impurities and further includes 0.5 to 3.0% of a compatibilizer, based on 100% by weight of the glass fiber-reinforced recycled polypropylene resin composition, and a weight average molecular weight of the glass fiber-reinforced recycled polypropylene resin composition is 250,000 g/mol or more.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
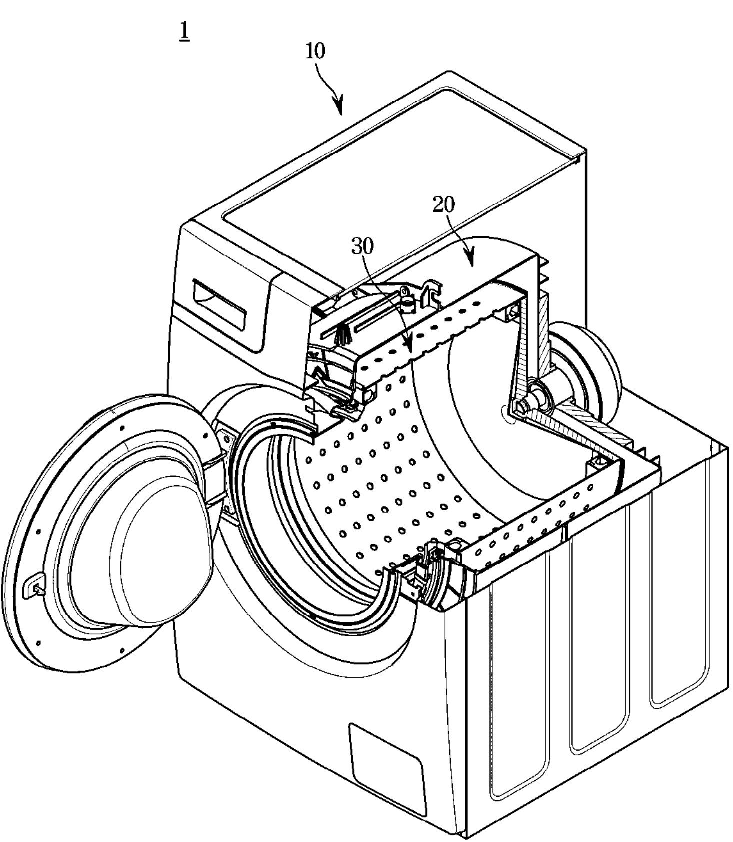
FIG. 1 is a schematic diagram of a washing machine according to an embodiment of the present disclosure.

Hereinafter, embodiments of the present disclosure will be described in detail with reference to the accompanying drawings. The following embodiments are presented to sufficiently convey the spirit of the present disclosure to a person having ordinary knowledge in the technical field to which the present disclosure belongs. The present disclosure may be embodied in other forms without being limited to only the embodiments presented herein. In the drawings, in order to clarify the present disclosure, the illustration of parts irrelevant to the description may be omitted, and the size of components may be slightly exaggerated to aid understanding.

Throughout the specification, when a part is said to "include" a component, this means that the part may further include other components rather than excluding other components unless specifically stated to the contrary.

Singular expressions include plural expressions unless the context clearly dictates otherwise.

Therefore, it is an aspect of the present disclosure to provide a recycled polypropylene resin composition having improved physical properties by optimizing a component range of waste GMT, a base resin, and long glass fiber-reinforced polypropylene, and a proper mixing ratio and mixing method of short fibers and long fibers, and a washing machine including the same.

The present disclosure, despite the use of recycled materials, secures mechanical properties and fatigue properties equivalent to or higher than those of conventional recycled materials as well as mass-produced new glass fiber-reinforced polypropylene, so that the recycled materials can also be applied to driving parts with complex shapes, and are not limited to non-functional interior parts.

Hereinafter, a glass fiber-reinforced recycled polypropylene resin composition according to one embodiment of the present disclosure will be described.

A glass fiber-reinforced recycled polypropylene resin composition according to one embodiment of the present disclosure is a glass fiber-reinforced recycled polypropylene resin composition including waste GMT, a homo-polypropylene base resin, long glass fiber-reinforced polypropylene, and a compatibilizer, wherein the composition includes, in weight percent, 10 to 30% of waste GMT, 35 to 47% of a homo-polypropylene base resin, 30 to 45% of long glass fiber-reinforced polypropylene and unavoidable impurities, and further includes 0.5 to 3.0% of a compatibilizer, based on 100% by weight of the glass fiber-reinforced recycled polypropylene resin composition.

The source to be recycled is a waste glass fiber mat-reinforced thermoplastic (GMT), and the content of waste GMT may be 10 to 30%.

In the present disclosure, the waste GMT, which is advantageous in terms of securing mechanical properties compared to other life/industrial recycled materials, can be selected as a source to be recycled in order to apply recycled materials to a drum washing machine tub injection-molded article.

The waste GMT has the advantage of maintaining glass fibers as they are because the flattening operation by a compression press is performed as an initial operation. In addition, it is possible to minimize the loss of physical properties due to breakage of and damage to glass fibers compared to other glass fiber-reinforced thermoplastic recycled resources. Since the waste GMT corresponds to industrial recycled resources, it is free from odor compared to daily life recycled resources, so that it is easy to recycle and turn into resources.

The waste GMT is used for back-beams for vehicles that have reached the end of their life or discarded, or cone panels for construction, and is a plate-shaped composite material processed by impregnating general polypropylene resin (PP) with a non-woven fabric formed by weaving long glass fibers equivalent to 100 mm or more or endless fibers into a mat structure.

In the present disclosure, the waste GMT is homo-polypropylene polymerized only with propylene, and is recovered in a state impregnated with 35 to 42% by weight of long glass fibers.

In the present disclosure, after the waste GMT is recovered, it can be crushed to a predetermined size and reduced to short fibers in a process of recycling the source to be recycled. When melt-extruded after crushing, an average fiber length of the glass fiber may be about 0.5 to 1.0 mm.

In the present disclosure, an average remaining fiber length means that the average of the lengths measured by randomly selecting 100 glass fibers within 1 cm*1 cm is 0.5 to 1.0 mm.

In the present disclosure, the waste GMT may include 38 to 42% of long glass fiber and 58 to 62% of a polypropylene resin, based on 100% by weight of the waste GMT.

In the present disclosure, when the content of waste GMT is less than 10%, an effect in terms of cost compared to the new material is insignificant. When the content of waste GMT exceeds 30%, physical properties may be deteriorated by causing crack generation points due to phase separation due to deterioration of recycled materials. Therefore, considering this, the content of waste GMT in the present disclosure is set to 10 to 30%.

A base resin is homo-polypropylene (HO-PP), and the content of homo-polypropylene may be 35 to 47%.

In the present disclosure, homo-polypropylene synthesized only with propylene can be used as the base resin. Homo-polypropylene is a representative general-purpose plastic, and since most of the sources to be recycled are also homo-polypropylene, it has high utilization.

In the present disclosure, by including homo-polypropylene as the base resin and including a base resin of the same type as the waste GMT included as a source to be recycled, miscibility between a recycled resin and the base resin can be imparted. Through this, it is possible to prevent phase separation between base materials due to deterioration during long-term use of the final product and prevent deterioration of long-term fatigue properties.

In order to secure long-term fatigue properties of the final product, the homo-polypropylene base resin may have a weight average molecular weight (Mw) of 300,000 g/mol or more.

The content of new long glass fiber-reinforced thermoplastic polypropylene composite resin (PP-LFT) may be 30 to 45%.

The new long glass fiber-reinforced thermoplastic polypropylene composite resin may be added to compensate for the poor physical properties of a recycled polypropylene resin. Long glass fibers are superior to short glass fibers in mechanical properties and heat resistance.

In the new long glass fiber-reinforced thermoplastic polypropylene composite resin, individual long glass fiber filaments are continuously coated with a thermoplastic polypropylene resin. The new long glass fiber-reinforced thermoplastic polypropylene composite resin includes long fibers having a diameter of 0.3 to 30 μm and a length of 3 to 100 mm.

In the present disclosure, 58 to 62% of a long fiber filament reinforcing material and 38 to 42% of a thermoplastic polypropylene resin may be included based on 100% by weight of the new long glass fiber-reinforced thermoplastic polypropylene composite resin.

In the present disclosure, when the content of long glass fiber-reinforced polypropylene is less than 30%, deterioration of physical properties caused by the recycled material cannot be compensated for. When the content of long glass fiber-reinforced polypropylene exceeds 45%, the fluidity of the molten composition in the mold is lowered, resulting in poor injection moldability. Therefore, in consideration of this, the content of the long glass fiber-reinforced thermoplastic polypropylene composite resin in the present disclosure is set to 30 to 45%.

In the present disclosure, the new long glass fiber-reinforced thermoplastic polypropylene composite resin may have a tensile strength of 1,400 kgf/cm$^2$ or more, a flexural modulus of 110,000 kgf/cm$^2$ or more, and an impact strength of 20 kgfcm/cm or more.

The compatibilizer may be further included in an amount of 0.5 to 3.0% based on 100% by weight of the glass fiber-reinforced recycled polypropylene resin composition.

In the present disclosure, the compatibilizer may be included to increase interfacial adhesion between a matrix and an inorganic material. In the present disclosure, the matrix may mean polypropylene, and the inorganic material may mean reinforcing fibers other than glass fibers.

In the present disclosure, the compatibilizer may be a thermoplastic resin grafted with maleic anhydride. The thermoplastic resin grafted with maleic anhydride may include, for example, polypropylene grafted with maleic anhydride (PP-g-MA), and an elastomeric coupling agent such as a propylene-based elastomer (PBE).

The present disclosure may further include 0.01 to 0.5% of additives based on 100% by weight of the glass fiber-reinforced recycled polypropylene resin composition.

In the present disclosure, when the additive is added, at least one additive that can be easily considered by those skilled in the art, such as a dispersant, an antioxidant, a heat-resistant stabilizer, and a long-term heat-resistant stabilizer, may be further included.

When the heat-resistant stabilizer is included as an additive, the heat-resistant stabilizer may play a role in preventing deterioration of physical properties during extrusion and injection processing by improving heat resistance.

When the heat-resistant stabilizer is included in the present disclosure, the heat-resistant stabilizer may be a phenol-based antioxidant, a phosphite-based antioxidant, and the like. In addition, the heat-resistant stabilizer may include tetrakis(methylene(3,5-di-t-butyl-4-hydroxy)hydrosilylnate), 1,3,5-trimethyl-tris(3,5-di-t-butyl-4-hydroxybenzene), or tris(2,4-di-t-butylphenol)phosphite.

When the long-term heat-resistant stabilizer is included as an additive, it may be added to prevent deterioration of physical properties during actual use of the final product.

When the long-term heat-resistant stabilizer is added in the present disclosure, a sulfur-based derivative compound including thiopropionic acid may be used as the long-term heat-resistant stabilizer.

Considering the effect of additives, in the present disclosure, the additive may be added at 0.01% or more. However, when the additive to be added is the heat-resistant stabilizer and the content of the heat-resistant stabilizer exceeds 0.5%, the heat-resistant stabilizer may be eluted or price competitiveness may be lowered, so that the upper limit of the heat-resistant stabilizer is 0.5%. In consideration of this, when the additive is included in the present disclosure, the additive to be added may be added at 0.01 to 0.5%.

When the glass fiber-reinforced recycled polypropylene resin composition is applied to the final product, especially when the composition is included as a drum washing machine tub part, the composition needs to secure mechanical properties and long-term fatigue properties against harsh external environmental conditions ranging from 1600 to 1800 RPM during a dehydration process as well as thermal changes applied during the hot water or drying process. Accordingly, the weight average molecular weight of the glass fiber-reinforced recycled polypropylene resin composition may be 250,000 g/mol or more.

Hereinafter, a method of preparing a glass fiber-reinforced recycled polypropylene resin composition according to one embodiment of the present disclosure will be described.

A method of preparing a glass fiber-reinforced recycled polypropylene resin composition of the present disclosure includes: preparing, in weight percent, 10 to 30% of waste GMT, 35 to 47% of a homo-polypropylene base resin, and 30 to 45% of long glass fiber-reinforced polypropylene, and 0.5 to 3.0% of a compatibilizer based on 100% by weight of the glass fiber-reinforced recycled polypropylene resin composition; and dry mixing the waste GMT and the long glass fiber-reinforced polypropylene.

In addition, the method of preparing a glass fiber-reinforced recycled polypropylene resin composition of the present disclosure may further include crushing the waste GMT to an average remaining fiber length of 0.5 to 1.0 mm after recovering the waste GMT before the preparing step.

In the present disclosure, the waste GMT may be as described in the glass fiber-reinforced recycled polypropylene resin composition. The waste GMT may be recovered in a state in which 35 to 42% by weight of long glass fibers corresponding to 100 mm or more or endless fibers are impregnated in general polypropylene resin (PP). In the present disclosure, the waste GMT may be crushed to an average remaining fiber length of 0.5 to 1.00 mm before being put into an extruder.

In the present disclosure, the base resin may be as described in the glass fiber-reinforced recycled polypropylene resin composition. By adopting homo-polypropylene as the base resin and including a base resin of the same type as waste GMT, miscibility between a recycled resin and the base resin can be imparted.

In the present disclosure, a crushed waste GMT and new long glass fiber-reinforced thermoplastic polypropylene composite resin can be dry-mixed. As a mixing method, it is possible to minimize breakage of glass fibers by adopting a dry mixing method rather than a method such as compounding. Through this, it is possible to minimize the loss of physical properties and secure the mechanical properties of the final product equal to or better than those of conventional recycled materials as well as new mass-produced materials.

In the present disclosure, the waste GMT, the base resin, and the new long glass fiber-reinforced thermoplastic polypropylene composite resin have enhanced miscibility, prevent deterioration of long-term fatigue properties, and minimize glass fiber breakage by using homo-polypropylene, which is the same type as a recycled resin, as the base resin and mixing in a dry mixing manner so that, in the final product, it is possible to obtain excellent mechanical properties equal to or higher than conventional recycled materials as well as mass-produced new materials.

In the method of preparing a glass fiber-reinforced recycled polypropylene resin composition of the present disclosure, when the glass fiber-reinforced recycled polypropylene resin composition is applied to the final product, especially when the composition is included as a drum washing machine tub part, the composition needs to secure mechanical properties and long-term fatigue properties against harsh external environmental conditions ranging from 1600 to 1800 RPM during a dehydration process as well as thermal changes applied during the hot water or drying process. Accordingly, the weight average molecular weight of the glass fiber-reinforced recycled polypropylene resin composition may be 250,000 g/mol or more.

In the present disclosure, in addition to a composition and a mixing method, it is possible to secure the fatigue properties of the final product by securing a weight average molecular weight of 250,000 g/mol or more for the final composition.

Hereinafter, a method of preparing an injection-molded article using the glass fiber-reinforced recycled polypropylene resin composition according to one embodiment of the present disclosure will be described.

Following the method of preparing the composition of the present disclosure, the crushed waste GMT, the new long glass fiber-reinforced thermoplastic polypropylene composite resin, the homo-polypropylene base resin, and the compatibilizer may be put into an injection molding process.

After the waste GMT is melted/kneaded at 160 to 230° C. in an extruder before being put into the injection molding process to prepare pellets, the new long glass fiber-reinforced thermoplastic polypropylene composite resin, the homo-polypropylene base resin, and the compatibilizer may be introduced into the molding process. Additives may be further included as needed.

However, the manufacturing method of an injection-molded article manufactured from the composition of the present disclosure is not particularly limited. The method includes injection molding of the glass fiber-reinforced recycled polypropylene resin composition of the present disclosure by any method of manufacturing an injection-molded article recognized by those skilled in the art to which the present disclosure belongs.

Hereinafter, mechanical properties of an injection-molded article made of the glass fiber-reinforced recycled polypropylene resin composition according to one embodiment of the present disclosure will be described.

In the present disclosure, the injection-molded article made of the glass fiber-reinforced recycled polypropylene resin composition can be used for a drum washing machine tub.

In the present disclosure, in order to use the injection-molded article made of the glass fiber-reinforced recycled polypropylene resin composition for the drum washing machine tub, the use environment of the drum washing machine tub parts may be considered. The drum washing machine tub parts need to secure mechanical properties and long-term fatigue properties against harsh external environmental conditions ranging from 1600 to 1800 RPM during a dehydration process as well as thermal changes applied during the hot water or drying process.

In the present disclosure, the injection-molded article made of the glass fiber-reinforced recycled polypropylene resin composition may have a specific gravity of 1.11 $g/cm^3$, a tensile strength of 1,100 $kgf/cm^2$ or more, a flexural modulus of 55,000 $kgf/cm^2$ or more, and an impact strength of 13 kgfcm/cm or more. In addition, the fatigue property may be 210 $kgf/cm^2$ or more.

In the present disclosure, by securing the mechanical properties as described above, while utilizing a source to be recycled, it is possible to secure short-term mechanical properties and fatigue resistance equivalent to or higher than those of conventional recycled materials as well as mass-produced new glass fiber-reinforced polypropylene. Through this, it is possible to apply it as a driving part having a complex shape without being limited to non-functional interior parts. In the present disclosure, the driving part may be applied to a driving part having a complex shape, such as a tub 20 disposed inside a cabinet 10.

Hereinafter, a drum washing machine according to one embodiment of the present disclosure will be described.

The present disclosure provides a drum washing machine including:

a cabinet; a tub disposed inside the cabinet; and a drum rotatably disposed inside the tub, wherein the tub consists of an injection-molded article made of a glass fiber-reinforced recycled polypropylene resin composition using waste GMT, the glass fiber-reinforced recycled polypropylene resin composition includes, in weight percent, 10 to 30% of waste GMT, 35 to 47% of a homo-polypropylene base resin, 30 to 45% of long glass fiber-reinforced polypropylene, and unavoidable impurities and further includes 0.5 to 3.0% of a compatibilizer, based on 100% by weight of the glass fiber-reinforced recycled polypropylene resin composition, and, the weight average molecular weight of the glass fiber-reinforced recycled polypropylene resin composition is 250,000 g/mol or more.

The reasons for including the waste GMT, the homo-polypropylene base resin, the long glass fiber-reinforced polypropylene, and the compatibilizer and the reason for limiting the ranges of components are as described above. In addition, an additive may be further included, which is also as described above. Hereinafter, a washing machine according to one embodiment of the present disclosure will be described with reference to the drawings.

FIG. 1 is a schematic diagram of a washing machine according to an embodiment of the present disclosure. In addition, FIG. 2 is a schematic view of a tub applied to a washing machine according to an embodiment of the present disclosure.

Referring to FIG. 1, a washing machine 1 may include a cabinet 10 forming an exterior; a tub 20 disposed inside the cabinet 10; and a drum 30 rotatably disposed inside the tub 20.

Figure 2:
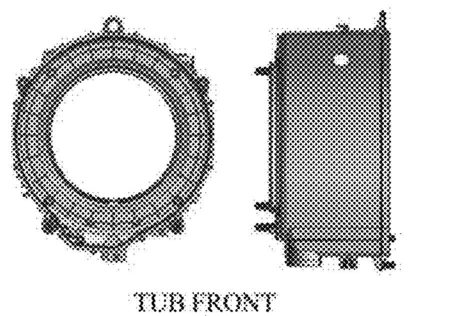
FIG. 2 is a schematic view of a tub applied to a washing machine according to an embodiment of the present disclosure.
Figure 2:
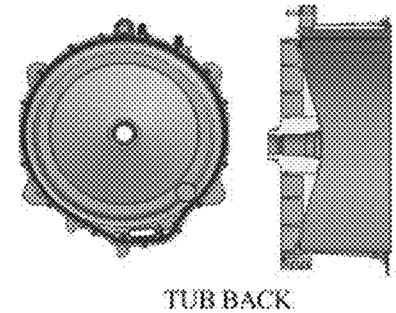

Referring to FIG. 2, front and rear surfaces of the tub 20 disposed inside the cabinet 10 can be seen. In the present disclosure, the tub 20 may correspond to an injection-molded article made of the above-described glass fiber-reinforced recycled polypropylene resin composition.

In the present disclosure, the tub 20 corresponds to an injection molded article made of the above-described glass fiber-reinforced recycled polypropylene resin composition, and may be applicable to the use environment of a washing machine by securing mechanical properties and fatigue characteristics equal to or higher than those of conventional recycled materials as well as new mass-produced materials.

Hereinafter, inventive examples and comparative examples are described to aid understanding of the present disclosure. However, the following description only corresponds to an example of the contents and effects of the present disclosure, and the scope and effects of the present disclosure are not necessarily limited thereto.

EXAMPLES

In the present disclosure, component ranges of waste GMT and PP-LFT were derived in a glass fiber-reinforced recycled polypropylene resin composition by varying the contents of long fibers and short fibers by varying a mixing ratio of waste GMT.

In addition, mechanical and fatigue properties of injection-molded articles made of the glass fiber-reinforced recycled polypropylene resin composition were confirmed by varying mixing methods. Through this, the mixing method and a weight average molecular weight value of a final composition were derived.

In addition, a base resin for enhancing miscibility was derived.

In the examples of the present disclosure, density was measured at room temperature using a densimeter (Manufacture: Industrial Physics Inc., Automatic Densimeter DSG-1).

In the examples of the present disclosure, tensile strength was measured at a speed of 50 mm/min at room temperature in accordance with ASTM D638 using a universal testing machine (UTM) (Model: Instron 5969, Capacity: 50 kN).

In the examples of the present disclosure, flexural modulus was measured at a speed of 2.8 mm/min at room temperature in accordance with ASTM D790 using a universal testing machine (UTM) (Model: Instron 3367, Capacity: 30 kN).

In the examples of the present disclosure, impact strength was measured using a pendulum impact tester (Manufacture: Zwick Roell Model: HIT5.5J) in accordance with ASTM D256 on V-notched Izod specimens.

In the examples of the present disclosure, for the fatigue properties, a stress range that can withstand repeated cycles corresponding to about 1 million cycles was derived by applying a stress ratio of 0.1, a load frequency of 10 Hz, and cyclic stress in which minimum stress and maximum stress are in the form of tensile-tensile at room temperature using an ASTM D638 standard tensile specimen.

In the examples of the present disclosure, the waste GMT is a source to be recycled, and waste GMT including 40% of long glass fiber and 60% of a polypropylene resin was used.

In addition, in the examples of the present disclosure, PP-LFT including 60% of long fiber filament reinforcing material and 40% of thermoplastic polypropylene resin were used.

In the examples of the present disclosure, HO-PP or HC-PP was used as a base resin.

In addition, in the examples of the present disclosure, a thermoplastic resin grafted with maleic anhydride was used as a compatibilizer.

<Waste GMT and PP-LFT of Glass Fiber-Reinforced Recycled Polypropylene Resin Composition>

In the case of a short glass fiber-reinforced composite material, the short fibers have a length of 0.5 mm to 1.0 mm. Short glass fibers have a shorter fiber length and are easier to disperse in a base resin of polypropylene, which is a base material, compared to long fibers. In addition, it is easy to mold up to the distal end of an injection-molded article. However, it is difficult to secure sufficient mechanical strength in an environment where a high tensile strength and external stress are applied to entire parts.

In the case of a long glass fiber-reinforced composite material, the long fibers have a length of 3 mm to 100 mm. The long glass fiber-reinforced composite material has excellent mechanical properties and heat resistance compared to the short-fiber-reinforced polypropylene composite material. However, when the content of glass fiber exceeds 30% based on 100% of the total composition weight, defects in moldability such as poor flowability in a mold during injection molding, the poor appearance of molded articles, poor workability for parts with complex shapes, and warpage and distortion depending on a aspect ratio may be caused.

Considering this, in the present disclosure, it was attempted to secure excellent mechanical and fatigue properties by mixing long fibers and short fibers in an appropriate ratio.

In particular, in the present disclosure, while using waste GMT as a source to be recycled and varying a content of waste GMT as shown in Tables 1 and 2 below, a content range was confirmed by considering waste GMT and the ratio of long fibers and short fibers of glass fiber-reinforced polypropylene.

In the case of conventional recycling and mass-produced new materials, the total glass fiber content corresponds to 30%. In consideration of this, 30% of total glass fibers was confirmed as a standard in order to secure physical properties equivalent to or higher than those of conventional recycling and mass-produced new materials, while including 30% of glass fibers.

Conventional recycling glass fiber-reinforced plastic (GFRP) refers to those including recycled polypropylene rather than recycled glass fibers. That is, conventional recycling in the present disclosure means that 70% of polypropylene including recycled polypropylene and 30% of new glass fibers are included. In addition, in the present disclosure, mass-produced new material means that 70% of new polypropylene and 30% of new glass fiber are included.

TABLE 1

| Classification | Waste GMT content (%) (R-PP60% + R-GF40%) | PP-LFT60 (%) | Base resin PP (%) | Long glass fiber (LGF) (%) | Short glass fiber (SGF) (%) | Total glass fibers (%) |
|---|---|---|---|---|---|---|
| Inventive Example 1-1 | 10.0 | 43.3 | 46.7 | 26.0 | 4.0 | 30.0 |
| Inventive Example 1-2 | 20.0 | 36.7 | 43.3 | 22.0 | 8.0 | 30.0 |
| Inventive Example 1-3 | 30.0 | 30.0 | 40.0 | 18.0 | 12.0 | 30.0 |
| Comparative Example 1-1 | 40.0 | 23.3 | 36.7 | 14.0 | 16.0 | 30.0 |
| Comparative Example 1-2 | 50.0 | 16.7 | 33.3 | 10.0 | 20.0 | 30.0 |
| Comparative Example 1-3 | 73.5 | 0 | 26.5 | 0 | 30.0 | 30.0 |

TABLE 2

| Classification | Glass fiber composition (%) | Waste GMT content (%) | Total glass fiber content (%) | Tensile strength (kgf/cm$^2$): |
|---|---|---|---|---|
| Inventive Example 1-1 | LGF26 + SGF4 | 10 | 30 | 1312 |
| Inventive Example 1-2 | LGF22 + SGF8 | 20 | 30 | 1242 |
| Inventive Example 1-3 | LGF18 + SGF12 | 30 | 30 | 1200 |
| Comparative Example 1-1 | LGF14 + SGF16 | 40 | 30 | 1021 |
| Comparative Example 1-2 | LGF10 + SGF20 | 50 | 30 | 945 |
| Comparative Example 1-3 | LGF0 + SGF30 | 73.5 | 30 | 800 |
| Reference Example 1 (mass-produced new material) | SGF30 | 0 | 30 | 1050 |
| Reference Example (conventional 2 (conventional recycling a) | SGF30 | 0 | 30 | 980 |
| Reference Example 3 (conventional recycling b) | LGF30 | 0 | 30 | 1190 |

Referring to Tables 1 and 2, Reference Example 1 (new mass-produced material) includes 30% of short glass fibers and has a tensile strength of 1050 kgf/cm$^2$. Reference Example 2 (conventional recycling a) includes 30% of short glass fibers and has a tensile strength of 980 kgf/cm$^2$. Through this, it can be confirmed that physical properties of the conventional recycled material are inferior to those of the mass-produced new material by including the recycled material.

Unlike Reference Example 2, Reference Example 3 (conventional recycling b) corresponds to recycled materials including 30% of long glass fibers. Reference Example 3 has a tensile strength of 1190 kgf/cm$^2$, and has relatively excellent physical properties compared to Reference Example 1 and Reference Example 2. However, it can be confirmed that even though all of the short glass fibers have been replaced by long glass fibers, a slightly higher tensile strength of about 140 kgf/cm$^2$ than that of Reference Example 1 was secured. In addition, as described above, Reference Example 3 includes fibers that are all long glass fibers, so that the advantage obtained by including the short glass fibers cannot be secured.

Comparative Example 1-3 shows a case where all of the glass fibers in the final composition are made of waste GMT. The tensile strength of Comparative Examples 1-3 is 800 kgf/cm$^2$, and it can be confirmed that the tensile strength is rather inferior to those of Reference Examples 2 and 3 using recycled PP other than conventional waste GMT. Through this, it can be confirmed that in order to utilize the waste GMT as a source to be recycled, it is necessary to include long glass fibers such as PP-LFT.

Comparative Example 1-1 included 40% of the waste GMT, and Comparative Example 1-2 included 50% of the waste GMT. However, it can be confirmed that Comparative Example 1-1 and Comparative Example 1-2 have lower tensile strength than mass-produced new materials and/or conventional recycled materials.

Inventive Example 1-3 includes 30% of waste GMT. 30% of PP-LFT was further included so that the total glass fibers in the final composition were 30%. It can be confirmed that the tensile strength is 1200 kgf/cm$^2$, which is superior to the conventional recycled materials as well as the mass-produced new materials.

Through this, considering a mixing ratio of long fibers and short fibers, it can be confirmed that a maximum content of waste GMT is 30%.

Considering this, in the present disclosure, while using the waste GMT as a source to be recycled, it was confirmed that the content of waste GMT can be 10 to 30% in order to secure mechanical and fatigue properties superior to conventional recycled materials as well as new mass-produced materials.

<Mixing Method and Weight Average Molecular Weight of Final Composition>

Table 3 below shows the mechanical and fatigue properties according to the mixing method. In the examples of the present disclosure, a dry mixing method and a compounding method were compared as mixing methods. Through this, the mixing method and the weight average molecular weight that can obtain excellent physical properties in a final product while using a source to be recycled by minimizing the breakage of glass fibers were confirmed.

However, although Comparative Example 2-1 had a weight average molecular weight similar to that of Reference Example 1, it can be confirmed that the mechanical properties except for impact strength were inferior to those of Reference Example 1, and the fatigue properties were also inferior.

The compositions of Inventive Example 2-1 and Inventive Example 2-2 were controlled the same as Comparative Example 2-1, but the mixing method was different. Inventive Example 2-1 and Inventive Example 2-2 were mixed using a dry mixing method rather than a compounding method.

It can be confirmed that Inventive Example 2-1 and Inventive Example 2-2 are superior in mechanical properties to both Reference Example 2 and Reference Example 1.

In addition, when the weight average molecular weight of Inventive Example 2-1 has a value similar to that of Reference Example 1, it can be confirmed that the fatigue properties as well as the mechanical properties are superior to those of Reference Example 1.

Through this, it was confirmed that by mixing in a dry mixing method, the breakage of glass fibers was minimized, and despite the use of recycled materials, mechanical properties were superior to those of conventional recycled and mass-produced new materials.

TABLE 3

| Classification | Composition | | | | | | Mixing method | Weight average molecular weight (Mw) (g/mol) | Mechanical properties | | | Fatigue properties (kgf/cm$^2$) |
|---|---|---|---|---|---|---|---|---|---|---|---|---|
| | HO-PP (%) | Recycled PP | Waste GMT (%) | PP-LFT (%) | SGF (%) | Compatibilizer (PP-g-MAH) (phr) | | | Tensile strength (kgf/cm$^2$) | Flexural modulus (kgf/cm$^2$) | Impact strength (kgf cm/cm) | |
| Inventive Example 2-1 | 40 | — | 30 | 30 | — | 1 | Dry | 270,751 | 1,200 | 57,857 | 14.43 | 225 |
| Inventive Example 2-2 | 40 | — | 30 | 30 | — | 1 | Dry | 198,606 | 1,150 | 58,612 | 13.75 | 208 |
| Comparative Example 2-1 | 40 | — | 30 | 30 | — | 1 | Compounding | 268,533 | 1,030 | 53,500 | 13.35 | 202 |
| Reference Example 1 (mass-produced new material) | 70 | — | — | — | 30 | 1 | Compounding | 266,839 | 1,050 | 53,564 | 12.95 | 222 |
| Reference Example 2 (Conventional recycling a) | 40 | 30 | — | — | 30 | 1 | Compounding | 185,342 | 980 | 50,005 | 9.53 | 171 |

Comparing Reference Example 1 (new mass-produced material) and Reference Example 2 (conventional recycled a), it can be confirmed that the mechanical properties and fatigue properties of the conventional recycled materials are reduced by including the recycled source compared to the mass-produced new materials.

Comparing Reference Example 2 and Comparative Example 2-1, it can be confirmed that Comparative Example 2-1 has excellent mechanical and fatigue properties compared to Reference Example 2 by using waste GMT as a source to be recycled and including PP-LFT.

In addition, it was confirmed that by controlling the weight average molecular weight to 250,000 g/mol or more as in the new mass-produced material, excellent mechanical properties as well as fatigue properties can be secured at the same time.

<Base Resin>

Table 4 below shows mechanical and fatigue properties according to a base resin.

In an embodiment of the present disclosure, it was confirmed whether mechanical and fatigue properties could be secured by improving miscibility with waste GMT by including HO-PP as the base resin.

TABLE 4

| Classification | Composition: HO-PP (%) | HC-PP (%) | Waste GMT (%) | LFT-PP (%) | SGF (%) | Compatibilizer (PP-g-MAH) (phr) | Mixing method | Weight average molecular weight (g/mol) | Mechanical properties: Tensile strength (kgf/cm$^2$): | Flexural modulus (kgf/cm$^2$) | Impact strength (kgf cm/cm) | Fatigue properties (kgf/cm$^2$) |
|---|---|---|---|---|---|---|---|---|---|---|---|---|
| Inventive Example 3-1 | 40 | — | 30 | 30 | — | 1 | Dry | 270,751 | 1,200 | 57,857 | 14.43 | 225 |
| Inventive Example 3-2 | 40 | — | 30 | 30 | — | 1 | Dry | 198,606 | 1,150 | 58,612 | 13.75 | 208 |
| Comparative Example 3-1 | — | 40 | 30 | 30 | — | 1 | Dry | 185,324 | 1,210 | 60,238 | 10.78 | 179 |
| Comparative Example 3-2 | — | 40 | 30 | 30 | — | 1 | Dry | 190,225 | 1,210 | 60,809 | 12.55 | 185 |

Inventive Example 3-1 and Inventive Example 3-2 used HO-PP as the base resin. HO-PP means polypropylene synthesized only from polypropylene of the same type as waste GMT.

Comparative Example 3-1 and Comparative Example 3-2 used HC-PP as the base resin. HC-PP means high crystallinity polypropylene.

Inventive Example 3-1 and Inventive Example 3-2 differed from Comparative Example 3-1 and Comparative Example 3-2 in only the base resin used in the composition, and the compatibilizer and the mixing method were the same.

It can be confirmed that Inventive Example 3-1 and Inventive Example 3-2 are superior in impact strength and fatigue properties to Comparative Example 3-1 and Comparative Example 3-2.

Through this, it was confirmed that excellent impact strength and fatigue properties of the final product can be secured by improving miscibility using HO-PP of the same type as waste GMT as the base resin.

Table 5 below shows a composition, a mixing method, a weight average molecular weight, and mechanical and fatigue properties of inventive examples, comparative examples, mass-produced new materials and conventional recycled materials of the present disclosure.

TABLE 5

| Classification | Composition: HO-PP (%) | HC-PP (%) | Recycled PP | Waste GMT (%) | PP-LFT (%) | SGF (%) | Compatibilizer (PP-g-MAH) (phr) | Mixing method | Weight average molecular weight (Mw) (g/mol) | Mechanical properties: Tensile strength (kgf/cm$^2$) | Flexural modulus (kgf/cm$^2$) | Impact strength (kgf cm/cm) | Fatigue properties (kgf/cm$^2$) |
|---|---|---|---|---|---|---|---|---|---|---|---|---|---|
| Inventive Example 5-1 | 46.7 | — | — | 10 | 43.3 | — | 1 | Dry mixing | 323,604 | 1,312 | 63,903 | 20.24 | 247 |
| Inventive Example 5-2 | 43.3 | — | — | 20 | 36.7 | — | 1 | Dry mixing | 298,990 | 1,242 | 62,517 | 17.74 | 233 |
| Inventive Example 5-3 | 40 | — | — | 30 | 30 | — | 1 | Dry mixing | 270,751 | 1,200 | 57,857 | 14.43 | 225 |
| Comparative Example 5-1 | 40 | — | — | 30 | 30 | — | 1 | Compounding | 268,533 | 1,030 | 53,500 | 13.35 | 202 |
| Comparative Example 5-2 | 40 | — | — | 30 | 30 | — | 1 | Dry mixing | 198,606 | 1,150 | 58,612 | 13.75 | 208 |
| Comparative Example 5-3 | — | 40 | — | 30 | 30 | — | 1 | Dry mixing | 185,324 | 1,210 | 60,238 | 10.78 | 179 |
| Reference Example 1 (mass-produced new material) | 70 | — | — | — | — | 30 | 1 | Compounding | 266,839 | 1,050 | 53,564 | 12.95 | 222 |
| Reference Example 1' (conventional new material) | — | 70 | — | — | — | 30 | 1 | Compounding | 186,434 | 1,115 | 55,520 | 11.35 | 173 |
| Reference Example 2 (conventional recycling a) | 40 | — | 30 | — | — | 30 | 1 | Compounding | 185,342 | 980 | 50,005 | 9.53 | 171 |
| Reference Example 2' (conventional recycling b) | — | 40 | 30 | — | — | 30 | 1 | Compounding | 183,222 | 973 | 50,959 | 10.06 | 163 |

Inventive Example 5-1 included 10% of waste GMT, and thus included 43.3% of PP-LFT and 46.7% of HO-PP by controlling a ratio of short fibers and long fibers. In addition, 1% of a compatibilizer was included based on 100% of the weight of the final composition. Inventive Example 5-1 used a dry mixing method. In Inventive Example 5-1, the weight average molecular weight of the final composition is 323, 604 g/mol. It can be confirmed that the mechanical and fatigue properties are superior to those of Reference Example 2 (conventional recycling a) and Reference Example 3 (conventional recycling b) as well as Reference Example 1 (new mass-produced material).

Inventive Example 5-2 included 20% of waste GMT, and thus included 36.7% of PP-LFT and 43.3% of HO-PP by controlling a ratio of short fibers and long fibers. In addition, 1% of a compatibilizer was included based on 100% of the weight of the final composition. Inventive Example 5-2 used a dry mixing method. In Inventive Example 5-2, the weight average molecular weight of the final composition is 298, 990 g/mol. It can be confirmed that the mechanical and fatigue properties are superior to Reference Example 2 and Reference Example 3 as well as Reference Example 1.

Inventive Example 5-3 included 30% of waste GMT, and thus included 30.0% of PP-LFT and 30.0% of HO-PP by controlling a ratio of short fibers and long fibers. In addition, 1% of a compatibilizer was included based on 100% of the weight of the final composition. Inventive Example 5-3 used a dry mixing method. In Inventive Example 5-3, the weight average molecular weight of the final composition is 270, 751 g/mol. It can be confirmed that the mechanical and fatigue properties are superior to Reference Example 2 and Reference Example 3 as well as Reference Example 1.

Comparative Example 5-1 had the same composition as Inventive Example 5-3, but a compounding method was adopted as a mixing method. The weight average molecular weight of the final composition is 268,533 g/mol. Although the weight average molecular weights of the final composition are similar to that of Inventive Example 5-3, it can be confirmed that both mechanical and fatigue properties are inferior.

In addition, Comparative Example 5-1 had a weight average molecular weight of the final composition similar to that of Reference Example 1, and used the same mixing method as Reference Example 1. However, it can be confirmed that Comparative Example 5-1 including the source to be recycled is inferior to Reference Example 1 in mechanical and fatigue properties except for impact strength.

However, Comparative Example 5-1 has a larger weight average molecular weight than Reference Examples 2 and 3. Despite including the source to be recycled, it can be confirmed that Comparative Example 5-1 has excellent mechanical and fatigue properties compared to conventional recycling.

Through this, it can be confirmed that, mechanical and fatigue properties superior to those of conventional recycling can be secured by using waste GMT as a recycled source, blending long glass fibers and short glass fibers, including PP-LFT, and adopting HO-PP as the base resin.

However, Comparative Example 5-1 did not secure the desired tensile strength, flexural modulus and fatigue properties because the mixing method was different from the conditions of the present disclosure.

Comparative Example 5-2 has the same composition and mixing method as Inventive Example 5-3, but has a weight average molecular weight of 198,606 g/mol smaller than 250,000 g/mol. The weight average molecular weight of Comparative Example 5-2 is similar to Reference Example 2 and Reference Example 3, but mechanical and fatigue properties are superior to those of Reference Example 2 and Reference Example 3. However, it can be confirmed that the impact strength and fatigue properties are inferior to those of Reference Example 1.

Through this, it can be confirmed that by controlling the weight average molecular weight of the final composition to 250,000 g/mol or more, mechanical properties as well as fatigue properties superior to those of Reference Example 1 can be secured.

In addition, Comparative Example 5-2 has excellent mechanical and fatigue properties compared to Comparative Example 5-1 despite a small weight average molecular weight due to the dry mixing method. Through this, it can be confirmed that mixing in a dry mixing method is advantageous in securing mechanical and fatigue properties.

However, in Comparative Example 5-2, the weight average molecular weight was different from the conditions of the present disclosure, so that the desired fatigue properties were not secured.

In Comparative Example 5-3, as in Inventive Example 5-3, long glass fibers and short glass fibers including waste GMT and LFT-PP were blended, mixing was performed in a dry mixing method, and HC-PP was adopted as a base resin. In addition, the weight average molecular weight of the final composition is 185,324 g/mol, which is 250,000 g/mol or less.

It can be confirmed that the flexural modulus and fatigue properties of Comparative Example 5-3 are inferior to those of Comparative Example 5-2. Through this, it can be confirmed that excellent impact strength and fatigue properties can be secured by using HO-PP as a base resin and improving miscibility with waste GMT.

In addition, it can be confirmed that, when comparing to Inventive Example 5-3, the weight average molecular weight is increased to 250,000 g/mol or more, and when HO-PP is used as the base resin, better impact strength and fatigue properties can be secured.

In addition, Comparative Example 5-3 has a weight average molecular weight of 185,324 g/mol, which is smaller than that of Reference Example 1. It can be confirmed that Comparative Example 5-3 has inferior impact strength and fatigue properties to those of Reference Example 1.

However, in Comparative Example 5-3, the weight average molecular weight and the base resin were different from the conditions of the present disclosure, so that the desired impact strength and fatigue properties were not secured.

Through this, it can be confirmed that both mechanical and fatigue properties can be secured better than Reference Example 1 by securing a weight average molecular weight of the final composition greater than 250,000 g/mol and enhancing miscibility by using HO-PP as the base resin.

EFFECTS OF THE INVENTION

According to one embodiment of the present disclosure, a recycled polypropylene resin composition having improved physical properties by optimizing a component range of waste GMT, a base resin, and long glass fiber-reinforced polypropylene, and a proper mixing ratio and mixing method of short fibers and long fibers, and a washing machine including the same, can be provided.

However, the effects that can be achieved by a glass fiber-reinforced recycled polypropylene resin composition and a washing machine using the same according to embodiments of the present disclosure are not limited to those mentioned above, and other effects not mentioned may be clearly understood by those skilled in the art from the following description.

What is claimed is:

1. A glass fiber-reinforced recycled polypropylene resin composition comprising:
   in weight percent of the glass fiber-reinforced recycled polypropylene resin composition, about 10 to 30% of waste glass fiber mat-reinforced thermoplastic (GMT);
   about 35 to 47% of a homo-polypropylene base resin;
   about 30 to 45% of long glass fiber-reinforced polypropylene; and
   about 0.5 to 3.0% of a compatibilizer,
   wherein a weight average molecular weight of the composition is about 250,000 g/mol or more.

2. The composition of claim 1, wherein the waste GMT includes about 38 to 42% of long glass fiber and about 58 to 62% of a polypropylene resin, based on 100% by weight of the waste GMT.

3. The composition of claim 1, wherein the waste GMT has an average remaining fiber length of about 0.5 to 1.0 mm.

4. The composition of claim 1, wherein the homo-polypropylene base resin has a weight average molecular weight of about 300,000 g/mol or more.

5. The composition of claim 1, wherein the long glass fiber-reinforced polypropylene includes about 58 to 62% of a long fiber filament reinforcing material and about 38 to 42% of a polypropylene resin, based on 100% by weight of the long glass fiber-reinforced polypropylene, and the long fiber filament reinforcing material having a diameter of about 0.3 to 30 μm and a length of about 3 to 100 mm.

6. The composition of claim 1, wherein the long glass fiber-reinforced polypropylene has a tensile strength of about 1,400 kgf/cm$^2$ or more.

7. The composition of claim 1, wherein the long glass fiber-reinforced polypropylene has a flexural modulus of about 110,000 kgf/cm$^2$ or more.

8. The composition of claim 1, wherein the long glass fiber-reinforced polypropylene has an impact strength of about 20 kgfcm/cm or more.

9. The composition of claim 1, wherein the compatibilizer is polypropylene grafted with maleic anhydride.

10. The composition of claim 1, further comprising about 0.01 to 0.5% of an additive based on 100% by weight of the glass fiber-reinforced recycled polypropylene resin composition.

11. The composition of claim 10, wherein the additive is one or more of a dispersing agent, an antioxidant, a heat-resistant stabilizer, or a long-term heat-resistant stabilizer.

12. An injection-molded article comprising the glass fiber-reinforced recycled polypropylene resin composition of claim 1.

13. A method of preparing a glass fiber-reinforced recycled polypropylene resin composition comprising:
   preparing, in weight percent of the glass fiber-reinforced recycled polypropylene resin composition,
      about 10 to 30% of waste glass fiber mat-reinforced thermoplastic (GMT),
      about 35 to 47% of a homo-polypropylene base resin,
      about 30 to 45% of long glass fiber-reinforced polypropylene, and
      about 0.5 to 3.0% of a compatibilizer; and
   dry mixing the composition.

14. The method of claim 13, wherein the waste GMT is recovered waste GMT, and the method further comprises:
   prior to the preparing, crushing the recovered waste GMT to an average remaining fiber length of about 0.5 to 1.0 mm.

15. The method of claim 13, wherein the glass fiber-reinforced recycled polypropylene resin composition has a weight average molecular weight of about 250,000 g/mol or more.

* * * * *